United States Patent
Takahashi et al.

(10) Patent No.: US 7,099,008 B2
(45) Date of Patent: Aug. 29, 2006

(54) ALIGNMENT ADJUSTER OF PROBE, MEASURING INSTRUMENT AND ALIGNMENT ADJUSTING METHOD OF PROBE

(75) Inventors: Yoshihiko Takahashi, Kawasaki (JP); Shuichi Kamiyama, Kawasaki (JP); Masanori Arai, Kawasaki (JP)

(73) Assignee: Mitutoyo Corporation, Kawasaki (JP)

( * ) Notice: Subject to any disclaimer, the term of this patent is extended or adjusted under 35 U.S.C. 154(b) by 106 days.

(21) Appl. No.: 10/211,291

(22) Filed: Aug. 5, 2002

(65) Prior Publication Data

US 2003/0030807 A1 Feb. 13, 2003

(30) Foreign Application Priority Data

Aug. 8, 2001 (JP) .................................. 2001-241240

(51) Int. Cl.
*G01B 11/26* (2006.01)
*G01B 11/00* (2006.01)

(52) U.S. Cl. ........................ 356/399; 356/138
(58) Field of Classification Search ................ 356/138, 356/399, 147, 139; 33/503, 556, 5
See application file for complete search history.

(56) References Cited

U.S. PATENT DOCUMENTS

| 3,741,555 | A | * | 6/1973 | Roesel | .................... 266/54 |
|---|---|---|---|---|---|
| 3,826,011 | A | | 7/1974 | D'Aniello | |
| 3,969,926 | A | * | 7/1976 | Walker et al. | ................ 73/620 |
| 4,537,509 | A | | 8/1985 | Kronfeld | |
| 4,644,274 | A | * | 2/1987 | Casarcia | .................... 324/262 |
| 4,722,336 | A | * | 2/1988 | Kim et al. | .................. 606/130 |
| 5,806,200 | A | * | 9/1998 | Brenner et al. | ............... 33/559 |
| 6,014,816 | A | * | 1/2000 | Matsumiya et al. | .......... 33/503 |
| 2002/0029128 | A1 | * | 3/2002 | Jones et al. | ................ 702/152 |

FOREIGN PATENT DOCUMENTS

| GB | 1 357 148 | 6/1974 |
|---|---|---|
| GB | 1 416 776 | 12/1975 |
| GB | 2 141 547 | 12/1984 |
| JP | S43-009792 B | 4/1968 |
| JP | A 7-146130 | 6/1995 |
| JP | 11-211426 | 8/1999 |
| JP | A 2002-22433 | 1/2002 |

\* cited by examiner

*Primary Examiner*—Zandra V. Smith
(74) *Attorney, Agent, or Firm*—Oliff & Berridge, PLC (57) ABSTRACT

A probe alignment adjuster (10) for adjusting an angle of a probe (22) for measuring a configuration of a workpiece has an angle adjuster (21) capable of adjusting the angle of the probe so that the angle aligns with a reference axis line. Since the angle of the probe and a hole angle can be accurately coincided in measurement by coinciding the angle of the probe (22) and the reference axis line, interference with a sidewall caused in inserting into a deep hole can be avoided, thereby preventing damage on the probe.

14 Claims, 10 Drawing Sheets

ALIGNMENT ADJUSTER OF PROBE, MEASURING INSTRUMENT AND ALIGNMENT ADJUSTING METHOD OF PROBE

BACKGROUND OF THE INVENTION

1. Field of the Invention

The present invention relates to an alignment adjuster for, before measurement, adjusting angle of a probe used for measuring shape of a deep hole and a deep tapped hole, a measuring instrument having the adjuster and an alignment adjusting method of a probe.

2. Description of Related Art

Conventionally, a three-dimensional position control system disclosed in Japanese Patent Publication No. 2902285 has been known as an example of using a contact-type touch signal probe.

In the three-dimensional position control system of the publication, a reference ball of which location and form deviation are known is measured by a probe to be calibrated, and the error of the probe to be calibrated is obtained based on the central coordinates value of the center of the measured reference ball.

The probe to be calibrated of the above publication is for measuring position error of the measurement ball at the tip end of the probe. However, a touch signal probe measures not only the position but also sidewall configuration and cylindricity of threaded or deep hole. In this case, measurement is impossible unless the probe is inserted deep into the hole.

However, when a long probe is used, the probe can be mounted with the axis center thereof being inclined. Accordingly, even when the tip end of a deep-hole sensing probe is calibrated, the probe interferes with sidewall of the deep hole and does not go further when inserting the probe into the deep hole while being slanted. If the probe is inserted ignoring the slight interference, the sensor can be broken.

SUMMARY OF THE INVENTION

An object of the present invention is to provide an alignment adjuster of a probe capable of accurately coinciding the probe angle with an angle of a hole to prevent damage on the probe, a measuring instrument having the adjuster and an alignment adjusting method of the probe.

An alignment adjuster of a probe according to an aspect of the present invention is for adjusting the angle of the probe for measuring a configuration of a workpiece before measurement, the adjuster having an angle adjuster capable of adjusting the angle of the probe so that the angle of the probe aligns with a reference axis line.

According to the present invention, when the angle of the probe differs from the reference axis line, the angle of the probe is adjusted by the angle adjuster to be aligned with the reference axis line. Since the angle of the probe and the reference axis line are always aligned before measurement, the probe angle and the hole angle can be accurately coincided in measurement. Accordingly, when the probe is inserted into a deep hole etc., the probe does not interfere with the sidewall of the hole, thereby preventing damage on the probe.

In the present invention, the reference axis line may extend in any direction, i.e., may extend horizontally, perpendicularly, obliquely etc. The angle adjuster may be arranged in any manner as long as the angle of the probe can be aligned with the reference axis line. For instance, the angle adjuster may be arranged as a handle provided on a component attached with the probe, the handle being rotated to adjust the angle of the probe together with the component, a screw member for adjusting the angle of the probe, a micrometer head instead of the screw member for adjusting the angle of the probe etc.

The angle adjuster according to the above aspect of the present invention may preferably have: a first micrometer head capable of fine adjustment of the angle of the probe within a first plane; and a second micrometer head capable of fine adjustment of the angle of the probe within a second plane.

According to the above aspect of the present invention, fine adjustment of the angle of the probe within the first plane is conducted by the first micrometer head and fine adjustment of the angle of the probe within the second plane is conducted by the second micrometer head. Since the fine adjustment of the angle within the two planes are respectively conducted by the micrometer heads, the angle can be aligned with the reference axis line even when there is only extremely small error, so that accurate alignment adjustment is possible.

Incidentally, the first plane and the second plane are normally orthogonally arranged.

In the adjuster of the present invention, a reference line corresponding to the reference axis line may preferably be formed by an edge surface of a reference block which is accurately adjusted in advance, the alignment adjuster may preferably have a indicator having a comparison reference line capable of comparing with the edge surface, the indicator being capable of being fixed at a predetermined position, and an observing mechanism provided with the indicator for observing the edge surface, and the comparison reference line consistent with the edge surface may preferably be a reference for adjusting the angle of the probe by the angle adjuster.

According to the above arrangement, the comparison reference line of the indicator provided to the observing mechanism is adjusted to be consistent with the edge surface corresponding to the reference axis line and the angle of the probe is adjusted based on the comparison reference line. Since the adjustment is conducted while comparing the comparison reference line and the probe by the observing mechanism, the adjustment process can be facilitated.

In the adjuster according to an aspect of the present invention, the observing mechanism may preferably be a microscope capable of observing the edge surface of the reference block disposed at the focus position or the probe, the indicator may preferably be a reticle provided adjacent to the eyepiece of the microscope, and the microscope may preferably be capable of being observed in either one of a first direction orthogonal with the first plane or a second direction orthogonal with the second plane.

According to the above arrangement, the reticle and the edge surface are aligned while looking through the microscope and the probe is adjusted to be consistent with the reticle. Further, since the probe adjustment to be consistent with the reticle is conducted based on the observation in two directions, further accurate adjustment is possible.

In the present invention, the microscope may preferably be provided to an attachment base through an arm in a manner capable of turning in the first and the second directions.

According to the above arrangement, the microscope is attached to the attachment base in a manner rotatable in two directions of the first and the second directions and the microscope is turned together with the turning movement of the arm, so that movement in the two directions can be facilitated.

In the present invention, the aspect ratio of the probe may preferably be more than 20.

According to the above arrangement, when a thin long probe is inserted into a deep hole for measurement, the axis line of the probe can be easily made consistent with the reference axis, so that unexpected interference of the target portion of the workpiece with the probe caused on account of error in attachment attitude of the probe can be prevented. Accordingly, the damage on the workpiece and the probe can be prevented. Further, deterioration of measurement reliability on account of probe deformation by the interference can be avoided.

A measuring instrument according to another aspect of the present invention is characterized in having the above-described alignment adjuster of a probe.

According to the above aspect of the present invention, since the measuring instrument has the alignment adjuster capable of fine adjustment of the probe angle before measuring the target portion, the angle of the probe can be aligned with a deep hole etc. before measurement. Accordingly, the measuring instrument can avoid damage on the probe.

An alignment adjusting method of a probe according to still another aspect of the present invention is for adjusting an angle of the probe for measuring a configuration of a workpiece, in which, when the angle of the probe differs from a reference axis line, the angle of the probe is adjusted by an angle adjuster to be aligned with the reference axis line.

According to the above aspect of the present invention, when the angle of the probe differs from a reference axis line, the angle of the probe is adjusted by an angle adjuster to be aligned with the reference axis line. Since the angle of the probe and the reference axis line are always aligned before measurement, the angle of the probe and a hole angle can be accurately coincided. Accordingly, when the probe is inserted into a deep hole etc., the probe does not interfere with the sidewall of the hole, thereby preventing damage on the probe.

The adjusting method of the present invention may preferably further include the steps of; setting a reference line corresponding to the reference axis line by an edge surface of a reference block which is accurately adjusted in advance; providing a indicator on which a comparison reference line capable of comparing with the edge surface on an observing mechanism for observing the edge surface or the angle of the probe; adjusting the indicator so that the comparison reference line of the indicator is consistent with the edge surface disposed at a predetermined position; comparing the comparison reference line of the indicator with the probe disposed at the predetermined position by the observing mechanism; and, when the comparison reference line is deviated from the angle of the probe within either one of the first plane or the second plane, adjusting the angle of the probe with the comparison reference line by at least one of a first micrometer head for fine adjustment of the angle within the first plane and a second micrometer head for fine adjustment of the angle within the second plane as the angle adjuster.

According to the above arrangement, since the adjustment can be conducted while comparing the comparison reference line with the probe by the observing mechanism, the adjustment process can be facilitated. Since the fine adjustment of the angle within the two planes are respectively conducted by the micrometer heads, the angle can be aligned with the reference axis line even when there is only extremely small error, so that accurate alignment adjustment is possible.

DETAILED DESCRIPTION OF PREFERRED EMBODIMENT(S)

An embodiment of the present invention will be described below with reference to attached drawings.

Figure 1:
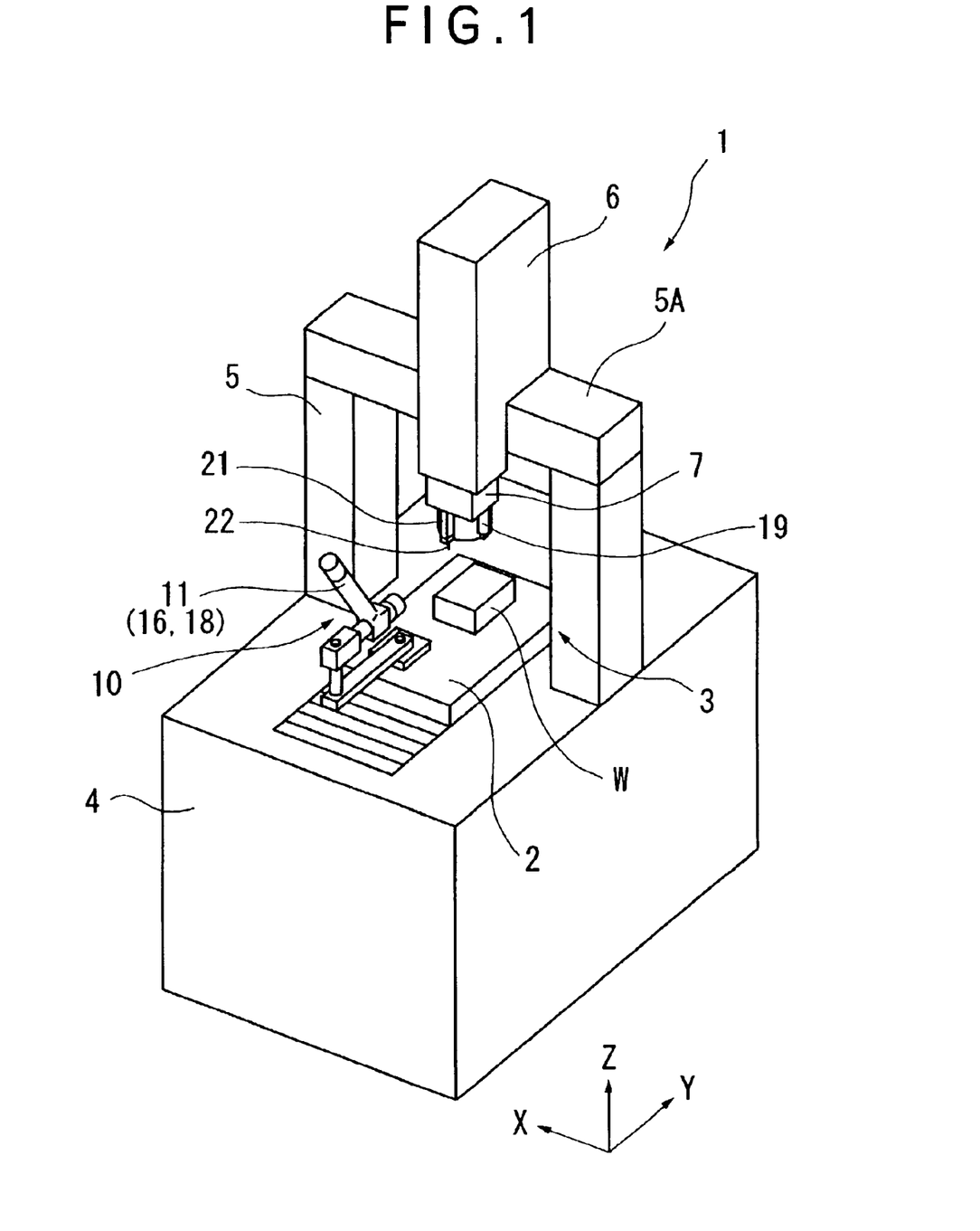
FIG. 1 is an entire perspective showing a measuring instrument according to an embodiment of the present invention.

FIG. 1 shows a measuring instrument 1 for measuring configuration of a deep hole and a deep tapped hole. The measuring instrument 1 has a table 2 on which a workpiece W to be put on, a relative movement mechanism 3 for relatively moving the table 2 in three-dimensional direction, and a probe alignment adjuster 10 (referred to simply as adjuster hereinafter).

An angle of a probe 22 of the measuring instrument 1 is adjusted, i.e. aligned with a reference axis by the adjuster 10 before measuring the workpiece W and, subsequently, the configuration of the workpiece, the configuration of a tapped hole shown in FIG. 10 for instance, is measured by the probe 22.

The relative movement mechanism 3 has a base 4 supporting the table 2 in a manner movable in back and forth direction (in Y-axis direction as a second direction), a bridge frame 5 vertically disposed on both sides of the base 4, a X-slider 6 supported by a horizontal beam 5A of the bridge frame 5 in a manner movable in right and left direction (X-axis direction as a first direction), and a Z-slider 7 supported by the X-slider 6 in a manner movable in vertical direction (Z-axis direction as a reference axis line). A target 19 as a indicator and an angle adjuster 21 constituting the adjuster 10 is attached at the lower end of the Z-slider 7.

Figure 4:
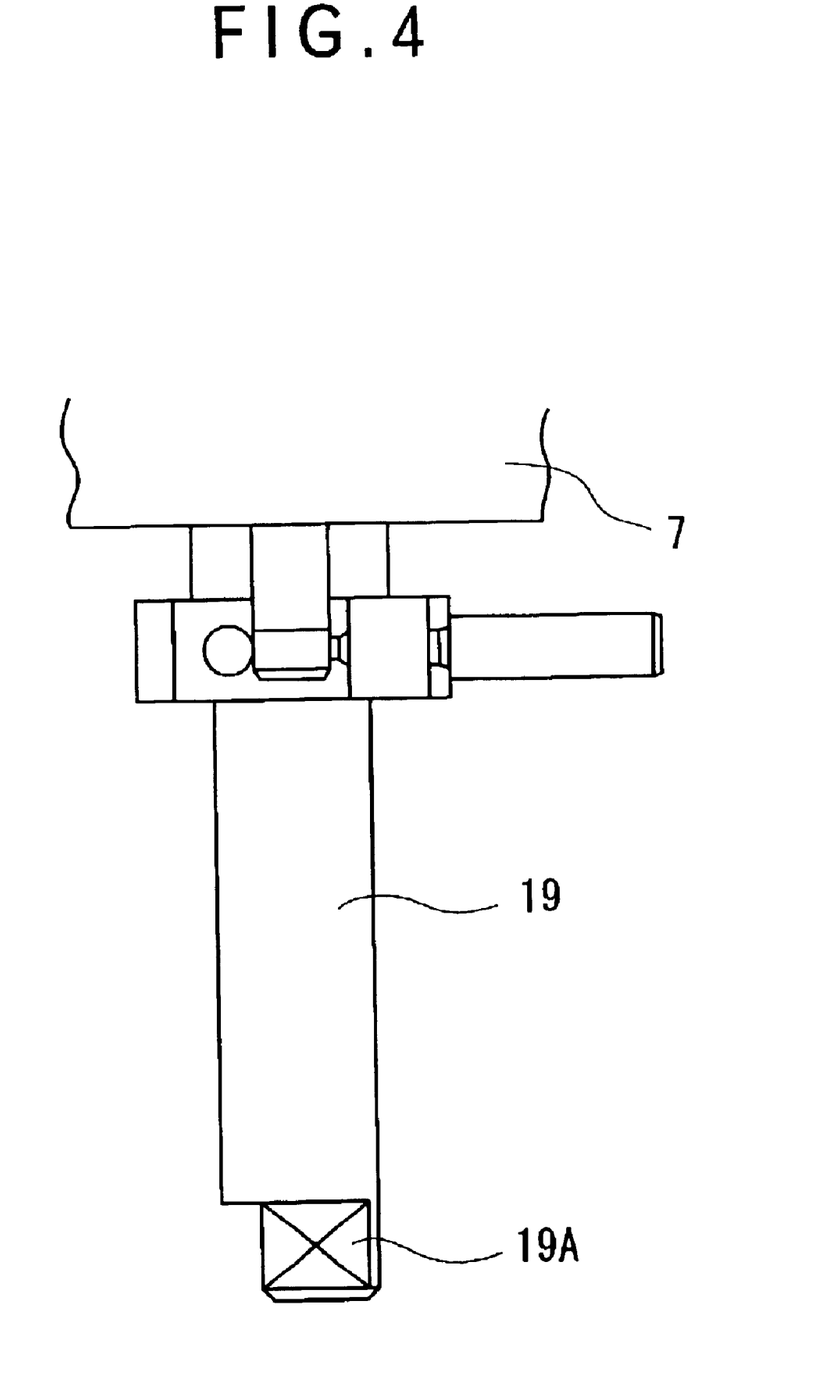
FIG. 4 is a side elevation showing a target having an edge surface of the aforesaid embodiment.

The target 19 is provided on the Z-slider 7 as shown in FIG. 4 and an edge surface 19A as a reference surface is formed on a distal end thereof. The edge surface 19A has two surfaces orthogonal with each other, the respective surfaces being accurately parallel to X-Z plane as a first plane and Y-Z plane as a second plane to be used as reference of comparison reference line of below-described reticle 18. In other words, the comparison reference line of the reticle 18 is adjusted to the edge surface 19A to be used as a reference for accurately positioning Z-axis direction of the probe 22. The target 19 is moved to a predetermined position by a joystick etc (not shown).

Incidentally, X-Z plane refers to a plane including X-axis and Z-axis and Y-Z plane refers to a plane including Y-axis and Z-axis.

Figure 2:
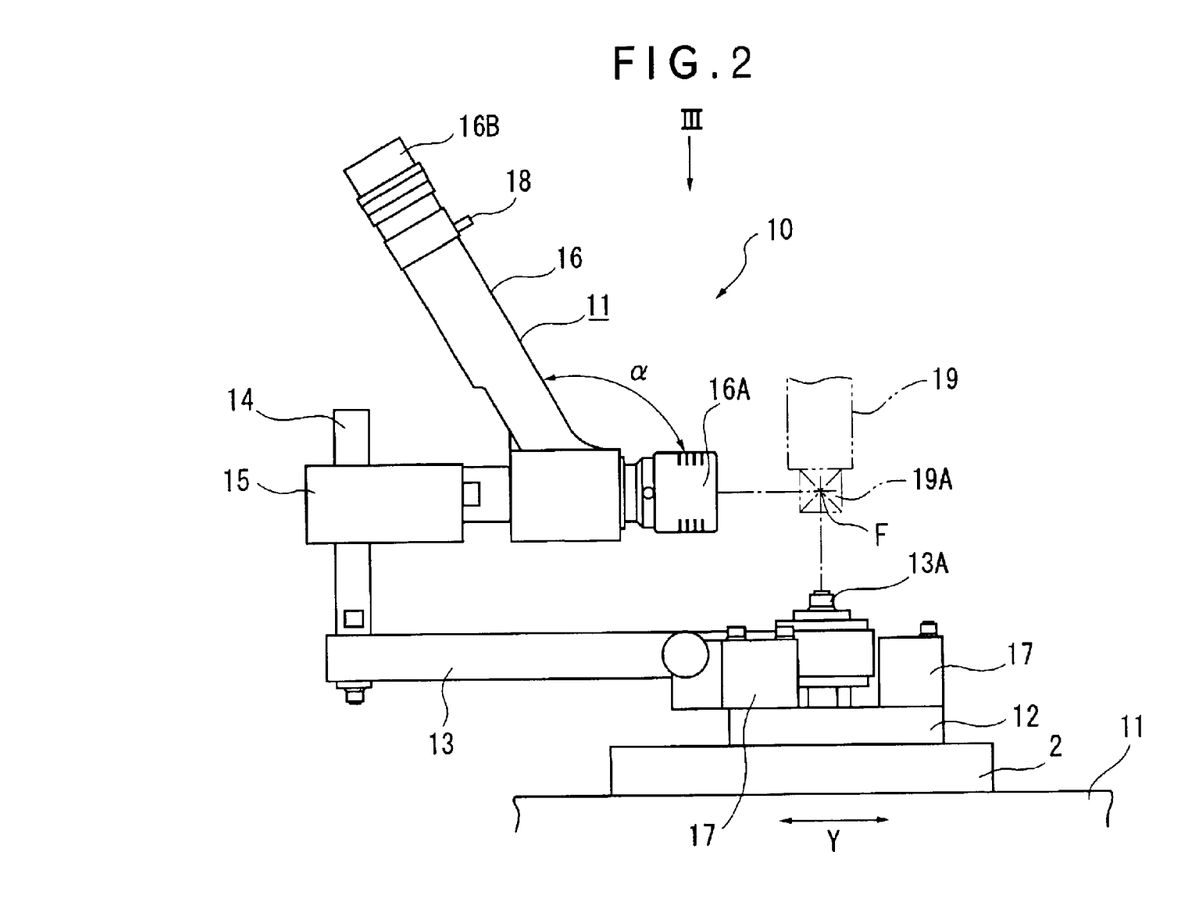
FIG. 2 is a side elevation showing a primary portion of the probe alignment adjuster according to the aforesaid embodiment.
Figure 3:
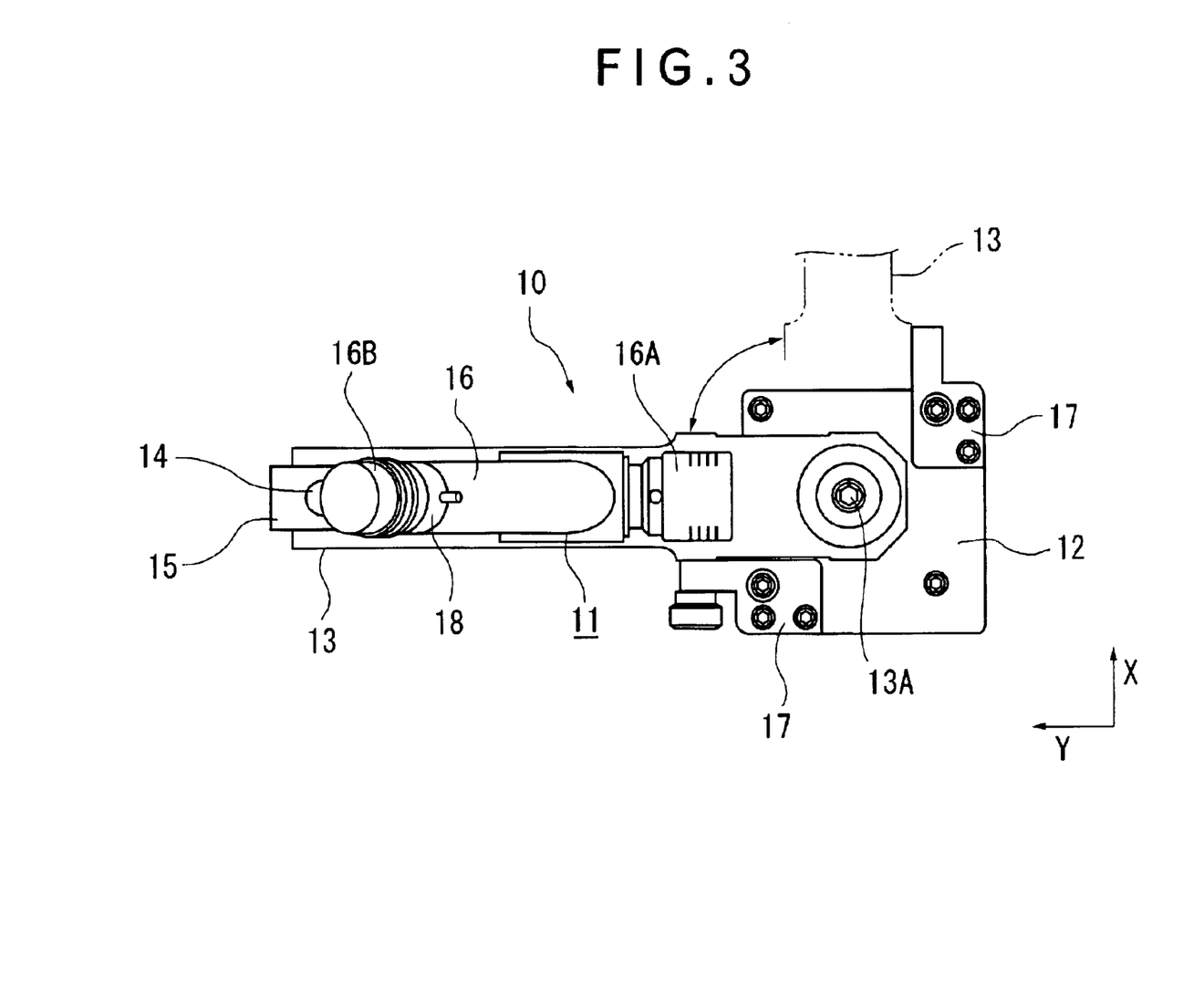
FIG. 3 is a view seen from the arrow III in FIG. 2.

As shown in FIGS. 2 and 3, the adjuster 10 has a probe observing mechanism 11 provided to the table 2 and the angle adjuster 21 provided to the Z-slider 7.

The probe observing mechanism 11 has an attachment plate 12 fixed to the table 2, a support arm 13 rotatably attached to the attachment plate 13 through a turning shaft 13A and horizontally extending in a direction away from the attachment plate 12, a column 14 vertically provided on an end remote from the turning shaft 13A of the support arm 13, an attachment base 15 provided to the column 14 along the support arm 13 and extending toward the attachment plate 12, and a microscope 16 attached to the attachment base 15.

The center of the turning shaft 13A and the focus position F of the microscope 16 are located on the same perpendicular plane and the axis line of the microscope 16 and the axis line of the support arm 13 are superposed on the same perpendicular plane. Accordingly, the microscope 16 and the support arm 13 can be turned on the horizontal plane around the focus position F in two directions of the X-axis and the Y-axis, thereby enabling observation in the two directions.

Two stoppers 17 having mutually orthogonal surfaces are provided on the attachment plate 12. Opposite sides of the turning support arm 13 are in contact with the surfaces of the stopper 17, so that the support arm 13 does not turn beyond ninety degrees.

The microscope 16 has an objective lens 16A opposing the focus position F and having horizontal optical axis, and an eyepiece 16B provided at a distal end of a cylinder rising from the objective lens 16A at an angle α.

Figure 5A:
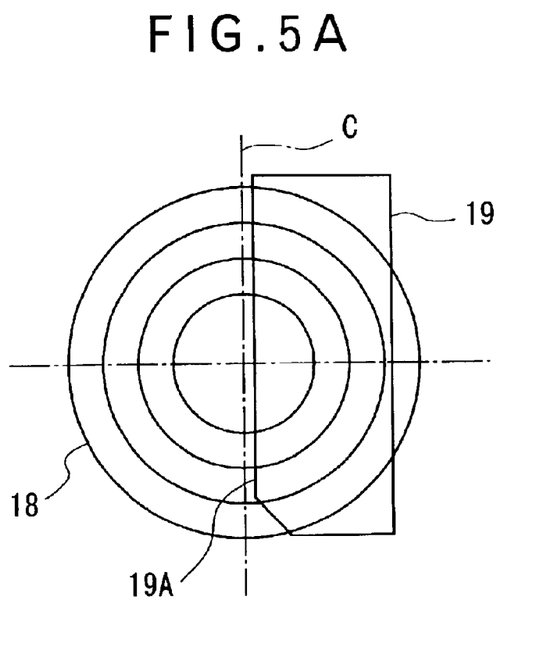
FIGS. 5(A) and 5(B) are illustrations respectively showing a relationship between a reticle and the target and a relationship between the reticle and the probe.
Figure 5B:
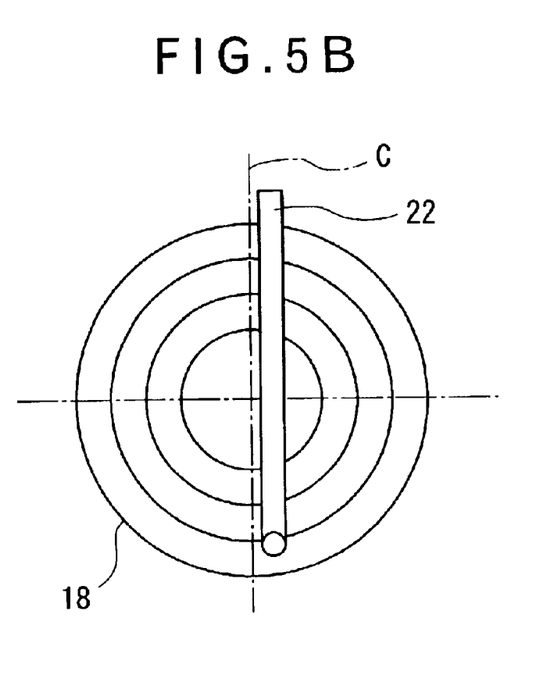

A reticle 18 as a indicator is provided adjacent to the eyepiece 16B of the microscope 16. As shown in FIGS. 5(A) and 5(B), a comparison reference line C is marked on the reticle 18 and the reticle 18 is rotatable and fixable at a predetermined position relative to the cylinder of the microscope 16.

As shown in FIGS. 6 to 9, the angle adjuster 21 has a probe unit 23 attached to the lower end of the Z-slider 7, and a first micrometer head 25 and a second micrometer head 26 provided to the probe unit 23. The first micrometer head 25 can conduct fine adjustment of the angle of the probe 22 in the X-Z plane, and the second micrometer head 26 can conduct fine adjustment of the angle of the probe 22 in the Y-Z plane.

Figure 6:
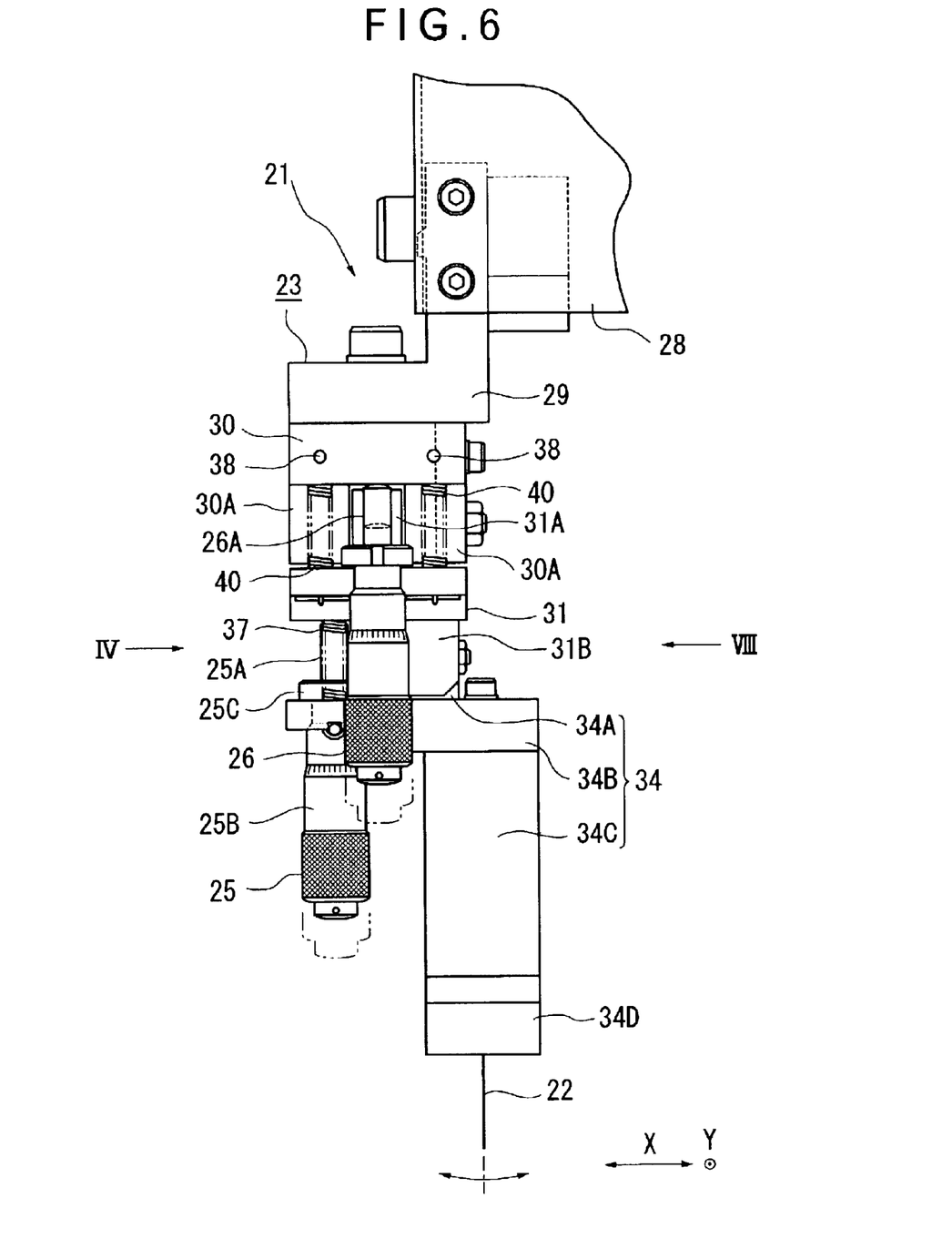
FIG. 6 is a front elevation showing an angle adjuster of the aforesaid embodiment.
Figure 7:
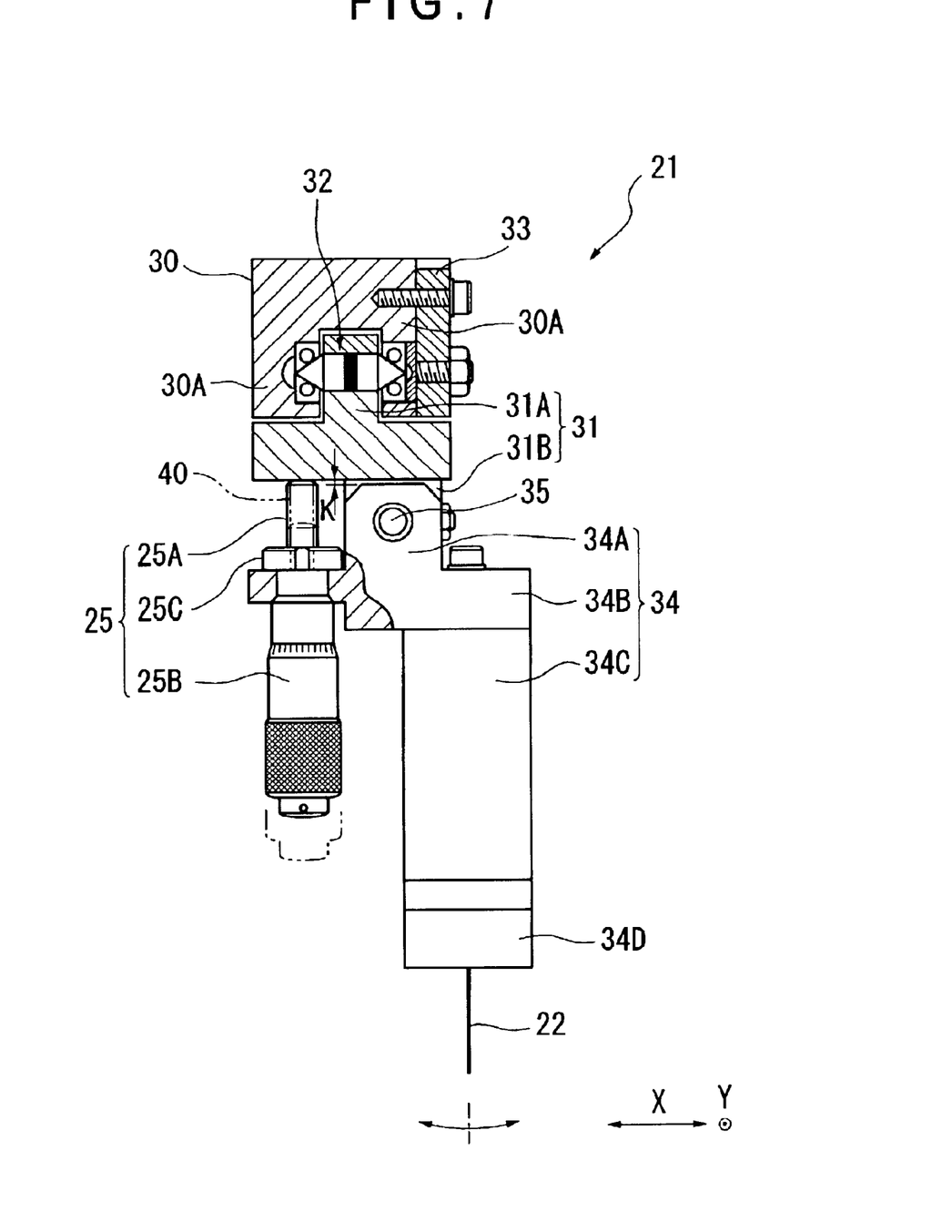
FIG. 7 is a partial cross section with a second micrometer head being removed in FIG. 6.

The probe unit 23 has an attachment frame attached to the Z-slider 7. A support 29 having L-shaped cross section is fixed to the lower side of the attachment frame 28 and a fixing member 30 is fixed to the lower side of the support member 29. The fixing member 30 has two projection plates 30A projecting downward provided on an end of horizontal plate portion as shown in FIG. 6 and on both ends of the fixing member 30 in width direction as shown in FIG. 7, so that the fixing member 30 has C-shaped cross section at the portion provided with the projection plate 30A as shown in FIG. 7. Incidentally, the projection plate 30A is disposed along Y-axis direction.

A pivot member 31 is connected to the fixing member 30 through a second bearing 32. The pivot member 31 has a convex portion 31A on an upper side thereof and a concave portion 31B on a lower side thereof. The pivot member 31 has approximately the same plane size as the fixing member 30. The convex portion 31A has width corresponding to the width of the projection plate 30A of the fixing member 30 and is sandwiched by the C-shaped portion. The second bearing 32 is provided between the projection plate 30A and the convex portion 31A as shown in FIG. 7.

The second bearing 32 is composed of a pair of pivot bearings, in which bearing portion receiving conical portion is disposed in the projection plate 30A and shaft portion having the conical portion is provided on the convex portion 31A, one of the bearing portions of the projection plate 30A being retained by a retainer 33. Further, a predetermined gap K (see FIG. 9) is secured between the upper surface of the convex portion 31A and the lower side of the plate portion of the fixing member 30.

As described above, the convex portion 31A is sandwiched between the projection plates 30A of the fixing member 30, the projection plate 30A and the convex portion 31A are connected by the second bearing 32 and the gap K is secured between the upper surface of the convex portion 31A and the lower side of the plate portion of the fixing member 30, so that the pivot member 31 can be pivotably moved in Y-Z plane.

A probe mount 34 having a convex portion 34A on an upper side thereof is pivotably connected to the lower side of the pivot member 31 through a first bearing 35 in a manner capable of pivot movement on the X-Z plane.

Specifically, the probe mount 34 has a first member 34B connected to the pivot member 31 and a second member 34C extending downward and integrated with the first member 34B for attaching the probe 22. The probe 22 is attached to a distal end of the second member 34C through a probe attachment 34D. The convex portion 34A of the probe mount 34 is sandwiched in the concave portion 31B on the lower side of the pivot member 31 and is connected by the first bearing 35 penetrating the convex portion 34A and the concave portion 31B.

Similar to the second bearing 32, the first bearing 35 is composed of a pair of pivot bearings, in which bearing portion receiving conical portion is disposed in the concave portion 31B and shaft portion having the conical portion is provided on the convex portion 34A, one of the bearing portions of the concave portions 31B being retained by the retainer 33. Further, a predetermined gap K (see FIG. 7) is secured between the upper side of the convex portion 34A and the lower side of the plate portion of the pivot member 31.

As described above, the convex portion 34A is sandwiched between the concave portions 31B, the convex portion 34A and the concave portion 31B are connected by the first bearing 35 and the gap K is secured between the upper surface of the convex portion 34A and the lower side of the plate portion of the pivot member 31, so that the pivot mount 34 can be pivotably moved in X-Z plane.

The probe unit 23 is constructed by the attachment frame 28, the support 29, the fixing member 30, the pivot member 31, the second bearing 32, the probe mount 34 and the fist bearing 35.

Figure 10:
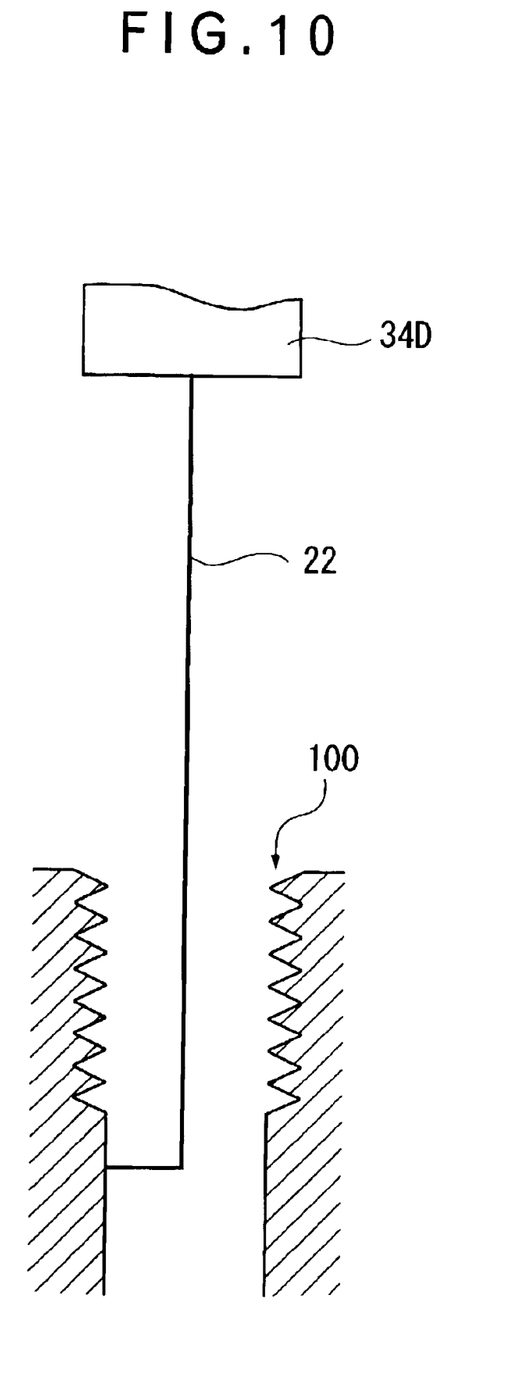
FIG. 10 is an illustration showing measurement of a deep tapped hole by the probe of the aforesaid embodiment.

The probe 22 attached to the tip end of the second member 34C can measure a deep tapped hole 100 as shown in, for instance, FIG. 10.

A first micrometer head 25 for fine adjustment of the angle of the probe 22 in X-Z plane is provided on the first member 34B of the probe mount 34. A second micrometer head 26 for fine adjustment of the angle of the probe 22 in Y-Z plane is provided on the pivot member 31.

The first micrometer head 25 is attached to the first member 34B by a clamp 25C holding the thin portion of the first member 34B so that a head 25A projects above the other end (opposite side of the second member 34C relative to the first bearing 35) and a scale 25B is positioned below the other end. When the scale 25B is rotated to advance the head 25A, the distal end of the first micrometer head can be in contact with the lower side of the pivot member 31.

First springs 37 stretch between the first member 34B and the pivot member 31 on both sides sandwiching the first micrometer head 25. The distal end of the coil of the first springs 37 are respectively hooked to fixed pins 38 buried in the first members 34B and the pivot member 31 to constantly urge the first micrometer head 25 side of the first member 34B toward the pivot member 31.

Accordingly, when the scale 25B of the first micrometer head 25 is turned in a predetermined direction to push up the lower side of the other end of the pivot member 31 by the distal end of the first micrometer head 25, the force is transferred from the first bearing 35 through the convex portion 34A to the first member 34B, i.e. the probe mount 34, so that the probe mount 34 is turned counterclockwise in the X-Z plane in FIG. 7.

On the other hand, when the first micrometer head 25 is turned in the opposite direction, the probe mount 34 can be turned clockwise in the X-Z plane in FIG. 7 by virtue of the first spring 37. Accordingly, the turning angle of the probe 22 in the X-Z plane can be minutely adjusted by adjusting the turning amount of the scale 25B.

As described above, the second micrometer head 26 is provided on the other end (opposite side of the second bearing 32) of the pivot member 31.

The second micrometer head 26 is attached to the pivot member 31 by a clamp 26C holding the thin portion of the pivot member 31 so that a head 26A projects above the other end and a scale 26B is positioned below the other end. When the scale 26B is rotated to advance the head 26A, the distal end of the second micrometer head can be in contact with the lower side of the horizontal plate of the fixing member 30.

Second springs 40 stretch between the pivot member 31 and the fixing member 30 on both sides sandwiching the second micrometer head 26 as shown in FIG. 6. The distal end of the coil of the second springs 40 are respectively hooked to the fixed pins 38 buried in the pivot member 31 and the fixing member 30 to constantly urge the second micrometer head 26 side of the pivot member 31 toward the fixing member 30.

Figure 8:
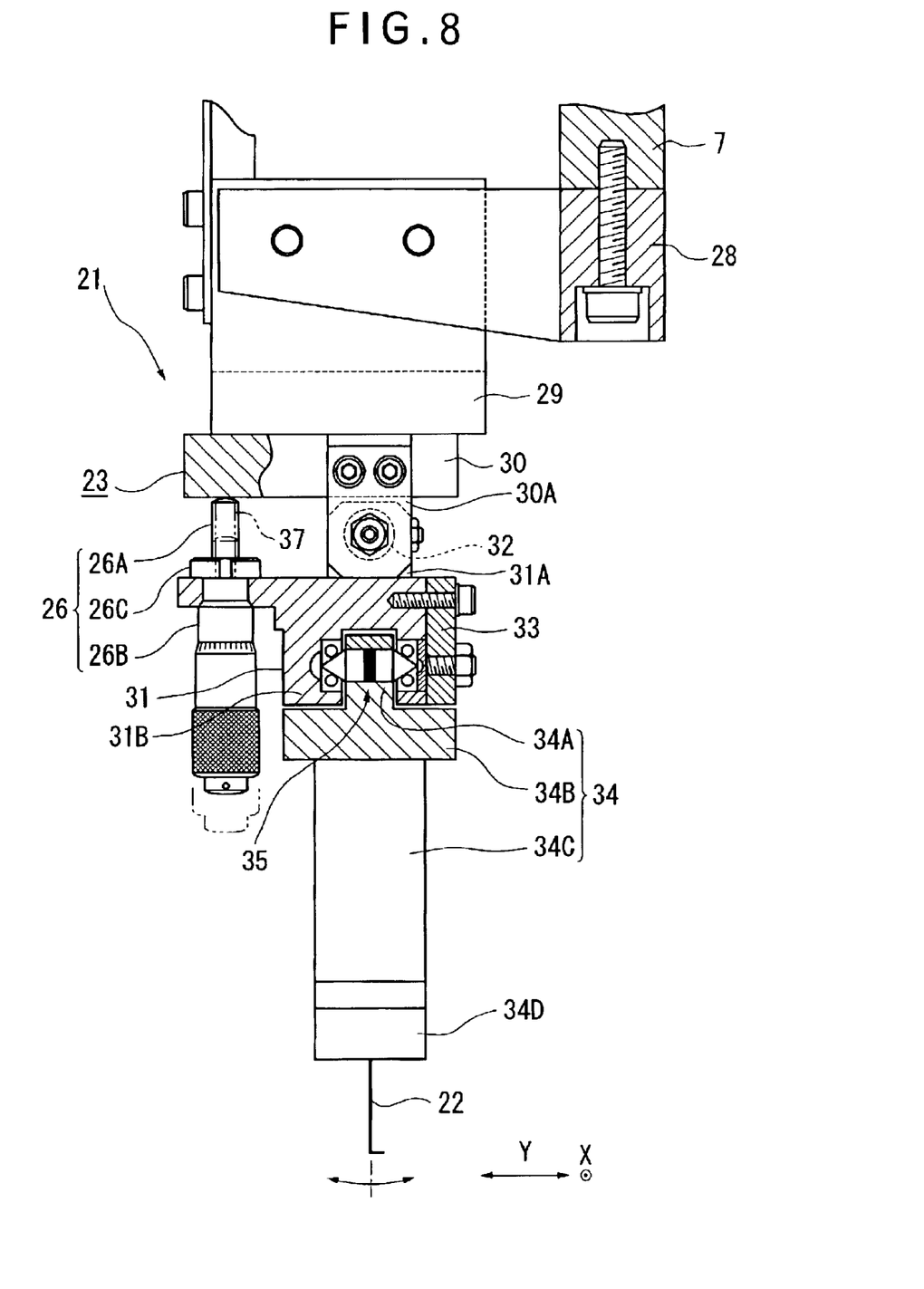
FIG. 8 is a view seen from the arrow VIII in FIG. 6.
Figure 9:
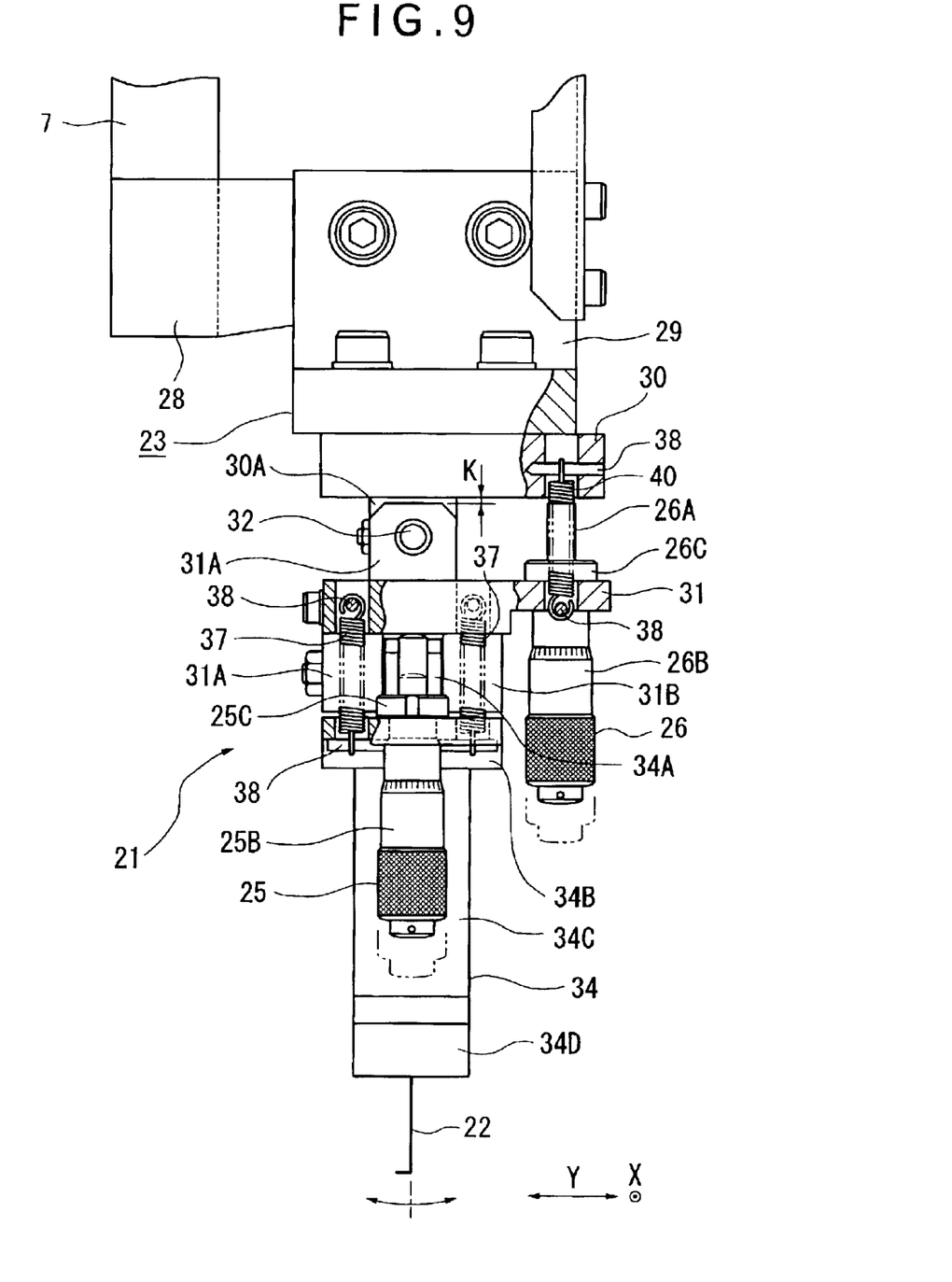
FIG. 9 is a view seen from the arrow IV in FIG. 6.

Accordingly, when the scale 26B of the second micrometer head 26 is turned in a predetermined direction to push up the lower side of the other end of the fixing member 30 by the distal end of the second micrometer head 26, the force is transferred from the second bearing 32 through the convex portion 31A to the pivot member 31, so that the probe mount 34 is turned counterclockwise in the Y-Z plane in FIG. 8.

On the other hand, when the second micrometer head 26 is turned in the opposite direction, the probe mount 34 can be turned clockwise in the Y-Z plane in FIG. 8 by virtue of the second spring 40. Accordingly, the turning angle of the probe 22 in the Y-Z plane can be minutely adjusted by adjusting the turning amount of the scale 26B.

Next, specific steps for measuring the deep tapped hole 100 by the above-described measuring instrument 1 will be described below.

Initially, adjustment step for accurately attaching the probe 22 in Z-axis direction, i.e. in the direction of the deep tapped hole 100, is conducted by the adjuster 10. At this time, the edge surface 19A of the target 19 attached to the Z-slider 7 is moved to the focus position F.

Next, the angle of the axis line of the microscope 16 is set, for instance, in a direction along the X-axis. The edge surface 19A set at the focus position F is inspected with the eyepiece and the comparison reference line C of the reticle 18 is superposed on the edge surface 19A. The reticle 18 is turned until the comparison reference line C and the edge surface 19A coincide with each other, thus completing adjustment of the reticle 18. The position of the adjusted reticle 18 is fixed to the microscope 16 while keeping the condition.

Subsequently, the target 19 is removed from the focus position F and the probe 22 of the angle adjuster 21 attached to the Z-slider 7 is set at the focus position F.

Thereafter, the comparison reference line C of the reticle 18 is superposed on the probe 22 while looking through the microscope 16 to observe the deviation therebetween. When the angle of the probe 22 is accurately consistent with the comparison reference line C of the reticle 18, the microscope 16 is rotated by ninety degrees in the horizontal plane for checking the angle of the probe 22 in the Y-axis direction and the comparison reference line C of the reticle 18 is superposed on the probe 22 to check the deviation therebetween. When no deviation in Y-axis direction is found, the workpiece put on the table 2 is moved by driving the relative moving mechanism 3 and is fixed thereafter, and the probe 22 is inserted into the deep tapped hole 100 to measure the configuration of the hole.

When the angle of the probe 22 is not consistent with the reference axis of the reticle 18 according to observation through the microscope 16 in the Y-axis direction, the scale 25B of the first micrometer head 25 is rotated in a predetermined direction to vary the push-up amount to the lower side of the other end of the pivot member 31 by the distal end of the first micrometer head 25. Then, the concave portion 31A side of the pivot member 31 is rotated by a predetermined dimension with the first bearing 31 as a fulcrum. The scale 25B is rotated until the angle of the probe 22 in the X-Z plane is consistent with the comparison reference line C of the reticle 18 to conduct fine adjustment.

When the angle of the probe 22 is not consistent with the reference axis of the reticle according to observation through the microscope 16 in the X-axis direction, the scale 26B of the second micrometer head 26 is rotated in a predetermined direction to vary the push-up amount to the lower side of the other end of the fixing member 30 by the distal end of the second micrometer head 26. Then, the projection plate 30A side of the fixing member 30 is rotated by a predetermined dimension with the second bearing 32 as a fulcrum. The scale 26B is rotated until the angle of the probe 22 in the Y-Z plane is consistent with the comparison reference line C of the reticle 18 to conduct fine adjustment.

When the angle of the Z-axis of the probe 22 in the X-axis direction and the Y-axis direction is consistent with the comparison reference line C of the reticle 18, the probe 22 is inserted into the deep tapped hole 100 to measure configuration etc. as describe above.

According to the present embodiment, following effects can be obtained.

(1) When the angle of the probe 22 differs from the reference line of the deep tapped hole 100, i.e. the Z-axis, the angle of the probe 22 can be adjusted by the angle adjuster 21 in the X-axis and the Y-axis directions before measurement to be consistent with the direction of the deep tapped hole 100. Accordingly, the probe 22 can be deeply inserted without interfering with the sidewall of the hole 100, so that damage on the probe 22 can be prevented and accurate measurement is possible.

(2) The comparison reference line C of the reticle 18 to be the standard for adjusting the angle of the probe 22 can be set by aligning the edge surface 19A of the target 19 accurately adjusted in advance corresponding to the Z-axis while looking through the microscope 16, so that the comparison reference line C can be easily adjusted.

(3) The angle of the probe 22 can be adjusted by superposing the comparison reference line C of the reticle 18 to the probe 22 and adjusting the angle adjuster 21 until the comparison reference line C is consistent with the probe 22. Accordingly, it is not necessary for the probe 22 to be aligned along the deep tapped hole 100 for each measurement, thereby improving the efficiency of angle adjustment. Further, even when a probe of which angle deviation is difficult to be adjusted by eyesight is used, it is only required that the comparison reference line C of the reticle 18 is superposed on the probe while looking through the microscope 16, so that the angle can be easily adjusted.

(4) The angle adjuster 21 has the first micrometer head 25 and the second micrometer head 26, where the angle of the probe 22 in the X-Z plane can be adjusted by the first micrometer head 25 and the angle of the probe 22 in the Y-Z plane can be adjusted by the second micrometer head 26. Since the angle adjustment in two axis directions can be conducted respectively by the micrometer heads 25 and 26, extremely small error angle can be adjusted with the deep tapped hole 100, so that accurate alignment adjustment is possible.

(5) Since the first bearing 35 and the second bearing 32 for smoothly turning the probe 22 in the X-Z plane and Y-Z plane are composed of two pivot bearings having small friction coefficient, the first and the second bearings can sensitively respond to minute force transferred without backlash by the first micrometer head 25 and the second micrometer head 26, so that fine adjustment of the angle of the probe 22 is possible.

(6) The first spring 37 spans between the first member 34B and the pivot member 31 and on both sides sandwiching the first micrometer head 25 and the second spring 40 spans between the pivot member 31 and the fixing member 30 and on a position sandwiching the second micrometer head 26, the first spring 37 and the second spring 40 constantly biasing the first member 34B and the pivot member 31, and the pivot member 31 and the fixing member 30 toward each other. Accordingly, the probe 22 can be displaced in a direction opposite to advancement of the heads 25A and 26A of the respective micrometer heads 25 and 26, thereby further accurately adjusting the probe 22.

(7) When a probe having great aspect ratio (length/diameter) of, for instance, more than 20 is used, it is difficult to attach the probe without causing angle error relative to the reference axis and it has been extremely difficult to check the probe attachment attitude in order to avoid interference between the workpiece and the probe in measuring a deep hole using the probe. However, according to the present embodiment, the attachment attitude of the probe (attachment angle relative to reference axis) can be easily checked and the attachment attitude can be easily corrected.

Incidentally, the scope of the present invention is not restricted to the above specific embodiment but includes following modification as long as an object of the present invention can be attained.

For instance, though the first bearing 35 and the second bearing 32 as fulcrum of the angle adjuster 21 in the X-Z plane and the Y-Z plane are constructed by pivot bearings, a normal ball bearing may be used.

Further, though the first spring 37 spans on the side of the first micrometer head 25 and the second spring 40 spans on the side of the second micrometer head 26, the first spring 37 and the second spring 40 respectively biasing the combination of the first member 34B and the pivot member 31 and the combination of the pivot member 31 and the fixing member 30 toward with each other, the arrangement of the respective springs is not limited. The spring may be arranged in any manner as long as the probe 22 can be displaced in a direction opposite to the advancement of the heads 25A and 26A of the respective micrometer heads 25 and 26. For instance, a spring (compression spring) for pushing the first member 34B and the pivot member 31 for constantly biasing the first micrometer head 25 side toward each other may be provided on the opposite side of the first micrometer head 25. The same applies to the second micrometer head 26.

Further, though the probe 22 of which angle is adjusted before measurement is used for measuring the deep tapped hole 100 in the above-described embodiment, the adjuster 10 of the present invention may be used, for instance, for measuring horizontal hole. In this case, the probe may be horizontally attached and one of the orthogonal comparison reference lines C of the reticle 18 may be superposed on the probe for inspection and adjustment.

Though the probe 22 of which angle is adjusted before measurement is used for measuring the deep tapped hole 100 in the aforesaid embodiment, the arrangement is not restricted. For instance, the probe may be a thin small-hole probe having diameter of μm unit and the present invention can be applied for measuring a thin small hole with extremely small clearance relative to the thin small-hole probe diameter. In this case, since the inspection and adjustment of the thin small-hole probe which are difficult by eyesight can be conducted using the microscope 16 and the reticle 18, the process can be facilitated and accurate angle alignment is possible, so that the damage on thin small-hole probe during measurement can be avoided.

Further, though the first micrometer head 25 and the second micrometer head 26 are used for fine adjustment of the angle of the probe 22, a screw member may be used instead of the micrometer heads 25 and 26. Specifically, the screw member may be screwed to pivotably move the fixing member 30 or the pivot member 31 to displace the probe 22. However, accuracy and operation efficiency of such arrangement are inferior to the arrangement using the micrometer heads 25 and 26.

Further, according to measurement process of the above-described embodiment, the edge surface 19A of the target 19 is initially observed from the X-axis direction (the first direction) to adjust the comparison reference line C of the reticle 18, and the angle error in the Y-Z plane is corrected while looking the probe 22 in the X-axis direction by comparing with the comparison reference line C of the reticle. Thereafter, the angle error in the X-Z plane is corrected by comparing with the comparison reference line C of the reticle while looking at the probe 22 in Y-axis direction (the second direction). However, in advance to angle error correction within the X-Z plane, the edge surface 19A of the target 19 may be observed in the Y-axis direction to adjust the comparison reference line C of the reticle 18, thereby correcting the angle error with higher accuracy.

What is claimed is:

1. An alignment adjuster of a probe for adjusting the angle of the probe for measuring a configuration of a workpiece before measurement, comprising:
   an angle adjuster capable of adjusting the angle of the probe so that the angle of the probe aligns with a reference axis line; and
   a reference block of which an edge surface is accurately adjusted in advance,
   wherein the reference axis line is given by the edge surface.

2. The alignment adjuster of a probe according to claim 1, the angle adjuster comprising: a first micrometer head capable of fine adjustment of the angle of the probe within a first plane; and a second micrometer head capable of fine adjustment of the angle of the probe within a second plane.

3. The alignment adjuster of a probe according to claim 1, wherein the alignment adjuster has a indicator having a comparison reference line capable of comparing with the edge surface, the indicator being capable of being fixed at a predetermined position, and an observing mechanism provided with the indicator for observing the edge surface, and
   wherein the comparison reference line consistent with the edge surface is a reference for adjusting the angle of the probe by the angle adjuster.

4. The alignment adjuster of a probe according to claim 3, wherein the observing mechanism is a microscope capable of observing the edge surface of the reference block disposed at the focus position or the probe,
   wherein the indicator is a reticle provided adjacent to the eyepiece of the microscope, and
   wherein the microscope can be observed in either one of a first direction orthogonal with the first plane or a second direction orthogonal with the second plane.

5. The alignment adjuster of a probe according to claim 4, wherein the microscope is provided to an attachment base through an arm in a manner capable of turning in the first and the second directions.

6. The alignment adjuster of a probe according to claim 1, wherein the aspect ratio of the probe is more than 20.

7. A measuring instrument comprising the alignment adjuster of a probe according to claim 1.

8. A measuring instrument comprising the alignment adjuster of a probe according to claim 2.

9. A measuring instrument comprising the alignment adjuster of a probe according to claim 3.

10. A measuring instrument comprising the alignment adjuster of a probe according to claim 4.

11. A measuring instrument comprising the alignment adjuster of a probe according to claim 5.

12. A measuring instrument comprising the alignment adjuster of a probe according to claim 6.

13. An alignment adjusting method of a probe for adjusting an angle of the probe for measuring a configuration of a workpiece, wherein, when the angle of the probe differs from a reference axis line, the angle of the probe is adjusted by an angle adjuster to be aligned with the reference axis line,
   wherein the reference axis line is given by an edge surface of a reference block of which the edge surface is accurately adjusted in advance.

14. The alignment adjusting method of a probe according to claim 13, further comprising the steps of;
   providing a indicator on which a comparison reference line capable of comparing with the edge surface on an observing mechanism for observing the edge surface or the angle of the probe;
   adjusting the indicator so that the comparison reference line of the indicator is consistent with the edge surface disposed at a predetermined position;
   comparing the comparison reference line of the indicator with the probe disposed at the predetermined position by the observing mechanism; and
   when the comparison reference line is deviated from the angle of the probe within either one of the first plane or the second plane, adjusting the angle of the probe with the comparison reference line by at least one of a first micrometer head for fine adjustment of the angle within the first plane and a second micrometer head for fine adjustment of the angle within the second plane as the angle adjuster.

* * * * *